US012662985B2

(12) United States Patent
Bates et al.

(10) Patent No.: US 12,662,985 B2
(45) Date of Patent: Jun. 23, 2026

(54) FLUID ROTARY MACHINE WITH AN ENCODER MODULE

(71) Applicant: Danfoss Power Solutions ApS, Nordborg (DK)

(72) Inventors: Charles Anthony Bates, Sønderborg (DK); Jay Lucas, Plymouth, MN (US); Tom Maagaard, Nordborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 0 days.

(21) Appl. No.: 18/983,546

(22) Filed: Dec. 17, 2024

(65) Prior Publication Data

US 2025/0207583 A1 Jun. 26, 2025

(30) Foreign Application Priority Data

Dec. 20, 2023 (DE) ......................... 102023135991.6
Sep. 9, 2024 (DE) ......................... 102024125796.2

(51) Int. Cl.
*F03C 2/08* (2006.01)
*F04C 2/08* (2006.01)
(Continued)

(52) U.S. Cl.
CPC .................. *F03C 2/08* (2013.01); *F04C 2/08* (2013.01); *F04C 14/04* (2013.01); *F04C 14/08* (2013.01);
(Continued)

(58) Field of Classification Search
CPC .... F03C 2/08; F04C 2/08; F04C 14/04; F04C 14/08; F04C 14/24; F04C 14/28;
(Continued)

(56) References Cited

U.S. PATENT DOCUMENTS 3,616,882 A * 11/1971 White ...................... F16H 39/02 418/61.3
3,716,311 A * 2/1973 Woodling ............... F01C 20/26 418/61.3
4,877,383 A * 10/1989 White, Jr. ........... F04C 15/0046 418/61.3
6,099,280 A * 8/2000 Bernstrom ................ F03C 2/08 418/61.3
(Continued)

FOREIGN PATENT DOCUMENTS

DE 60202005 T2 3/2006
DE 102010012850 A1 9/2011
(Continued)

*Primary Examiner* — Charles G Freay
(74) *Attorney, Agent, or Firm* — McCormick, Paulding & Huber PLLC

(57) ABSTRACT

A fluid rotary machine (100, 200) includes a first movement chain with a motor (101, 201) including a motor shaft (102, 202) rotationally coupled to a valve element (103, 203), for example a disc valve element (103) or a spool valve element (203), and a motor control unit configured to control rotational movement of the motor shaft (102, 202). The valve element (103, 203) is configured to control a fluid flow to a gear wheel (114, 214) of a second movement chain. The second movement chain includes the gear wheel (114, 214), a cardan shaft (116, 216) and an output shaft (117, 217), wherein the cardan shaft (116, 216) is rotationally coupled to the gear wheel (114, 214) and the output shaft (117, 217). In order to provide an improved fluid rotary machine, which especially allows more flexible and accurate control of rotational movements of components (114, 214, 116, 216, 117, 217) of the second movement chain are rotatable relative to the motor shaft (102, 202). Further, an encoder module (110, 210) includes a sensor arrangement configured to detect rotational movement of a component of the second movement chain, for example, of the cardan shaft (116, 216) and/or the output shaft (117, 217) is provided.

20 Claims, 2 Drawing Sheets

(51) Int. Cl.
*F04C 14/04* (2006.01)
*F04C 14/08* (2006.01)
*F04C 14/24* (2006.01)
*F04C 14/28* (2006.01)
*F04C 15/00* (2006.01)

(52) U.S. Cl.
CPC .............. *F04C 14/24* (2013.01); *F04C 14/28* (2013.01); *F04C 15/0057* (2013.01); *F04C 2240/60* (2013.01); *F04C 2240/81* (2013.01); *F04C 2270/052* (2013.01)

(58) Field of Classification Search
CPC .............. F04C 15/0057; F04C 2240/60; F04C 2240/81; F04C 2270/052; F04B 7/0023; F04B 7/0046
USPC ........................................................... 417/46
See application file for complete search history.

(56) References Cited

U.S. PATENT DOCUMENTS

| | | | | |
|---|---|---|---|---|
| 6,439,101 | B1 | 8/2002 | Kodama et al. | |
| 6,917,857 | B2 * | 7/2005 | Rentmeester | F25B 41/34 700/282 |
| 8,684,710 | B2 * | 4/2014 | Jingzhi | F04C 15/066 417/510 |
| 9,086,050 | B2 * | 7/2015 | Tychsen | F04C 2/104 |
| 11,092,153 | B2 | 8/2021 | Pawellek et al. | |

FOREIGN PATENT DOCUMENTS

| | | | | |
|---|---|---|---|---|
| DE | 102015119719 | A1 | 5/2016 | |
| DE | 102014119085 | A1 | 6/2016 | |
| EP | 0835382 | B1 | 3/1999 | |
| WO | 9701711 | A1 | 1/1997 | |
| WO | WO-2008125106 | A1 * | 10/2008 | F04C 2/106 |

* cited by examiner

FLUID ROTARY MACHINE WITH AN ENCODER MODULE

CROSS-REFERENCE TO RELATED APPLICATIONS

This application claims foreign priority benefits under 35 U.S.C. § 119 to German Patent Application No. 102023135991.6 filed on Dec. 20, 2023, and No. 102024125796.2 filed on Sep. 9, 2024, the contents of each of which are hereby incorporated by reference in their entirety.

TECHNICAL FIELD

The present invention relates to a fluid rotary machine comprising a movement chain for rotating an output shaft as part of the movement chain.

BACKGROUND

Fluid rotary machines as orbital motors are generally known in the art. A mechanical output on an output shaft of such machines can be used in different areas of application as work and drive systems, for example, in agriculture, construction, utilities, etc.

The fluid rotary machines are typically suitable for closed or open loop hydraulic circuits, wherein rotational movement of the output shaft is controlled by supplying pressurized fluid to pressure pockets or chambers formed by a gear wheel, for example, a gerotor or geroler, thereby rotating the gear wheel and transferring rotational movement of the gear wheel via a cardan shaft to the output shaft. The displacement, i.e., the rotational position, and speed of the output shaft may thus be controlled by regulation of fluid supply to the gear wheel using a valve element. Typically, the position of the valve element is controlled by a gearset, e.g. a gerotor or geroler, via a valve cardan. The timing of the motor is thus controlled via a coupling of the gearset, valve cardan and valve element. Therefore, positioning of the valve element and therefore fluid supply to the gear wheel is determined through this coupling.

Such fluid rotary machines, which are known in the state of the art, however, have the disadvantage that rotation of the valve element is often mechanically coupled to the rotation of the output shaft. Accordingly, the rotation of the output shaft is often dependent on the valve element position, wherein rotation of the valve element is directly coupled to the rotation of the output shaft. It is therefore rather difficult to control the rotational movement of the output shaft, especially in the event of external condition changes, such as pressure variations in the fluid circuit, which makes the fluid rotary machine less flexible and less accurate, for example less accurately rotating at a constant rotational speed.

SUMMARY

It is therefore an object of the present invention to provide an improved fluid rotary machine, which especially enables more flexible and accurate control of rotational movements of the output shaft.

The object is solved by a fluid rotary machine according to the present disclosure.

The fluid rotary machine comprises a first movement chain, a second movement chain and an encoder module. The first and second movement chain may be fully or partially arranged inside a housing of the fluid rotary machine. The first movement chain comprises a motor with a motor shaft. The motor shaft is rotationally coupled to a valve element. In other words, the motor shaft is rotatable, for example about a motor shaft axis, and wherein upon rotation of the motor shaft, the valve element coupled to the motor shaft is rotated.

The valve element may be a disc valve element or a spool valve element. The use of a disc valve element instead of a spool valve element may reduce the size or lengths of the fluid rotary machine, as the disc valve element requires less space than the spool valve element. The rotation of the valve element may allow and/or interrupt fluid flow through ports, fluid channels and the like. For example, depending on the rotational position of the valve element, different fluid paths may be formed that allow fluid to flow to a gear wheel and to be more precise to chambers of the gear wheel. A fluid path to and from the gear wheel may be shaped with respect to flow pressure of the fluid. Depending on a direction of rotation of the gear wheel, high-pressure side and low-pressure side may swap.

A motor control unit is configured to control rotational movement of the motor shaft. The motor control unit may for example control the rotational position, the direction of rotation and/or the rotational speed of the valve element. The motor control unit may be part of the motor. However, the motor control unit may also be external. In other words, the motor control unit may be arranged separately from the motor and may for example be electrically or wirelessly connected to the motor in order to transmit control signals to the motor, thereby controlling the rotational movement of the motor shaft.

Since the motor shaft is coupled to the valve element, wherein rotation of the motor shaft rotates the valve element, the valve element is configured to control a fluid flow to a gear wheel of a second movement chain, dependent on the rotational movement of the motor shaft. The gear wheel may comprise pressure pockets or chambers. The pressure pockets or chambers may be formed by the gear wheel and a respective stationary component such as a gear wheel housing in which the gear wheel may rotate. The gear wheel may be a star or a geroler. In other words, rotational movement of the valve element may control the fluid flow in and out the pressure pockets or chambers of the gear wheel. The rotational movement of the valve element may thus control a faster or slower filling and emptying of the chambers by faster or slower valve element rotation and therefore for example the rotational speed of the gear wheel.

In addition to the gear wheel, the second movement chain comprises a cardan shaft and an output shaft. The cardan shaft is rotationally coupled to the gear wheel and the output shaft. In other words, the cardan shaft transmits rotational movement between the gear wheel and the output shaft. In this regard, the gear wheel may perform an orbiting rotational movement, wherein the cardan shaft transmits said movement to the output shaft, and wherein the output shaft is performing a pure rotational movement. The direction of rotation of the output shaft may depend on the direction of rotation of the motor. The gear wheel may comprise a through hole with inner splines which may engage with outer splines of the cardan shaft which may be arranged partially on an outer circumference of the cardan shaft. Therefore, the gear wheel and the cardan shaft may comprise a splined engagement which allows to transmit rotational movement between the gear wheel and the cardan shaft.

The gear wheel, the cardan shaft and the output shaft are rotatable relative to the motor shaft. Consequently, rotational movement of the first movement chain comprising the motor shaft and the valve element may not be directly mechanically transmitted to the second movement chain. In other words, the first movement chain and the second movement chain may be mechanically uncoupled. Therefore, the motor drives the valve element, for example the disc valve or spool valve, independently from the gear wheel. This enables to adjust valve timing in relation to the gear wheel orientation, which again allows to adjust the fluid rotary machine for specific needs. For example, volumetric efficiency may be improved, i.e. the relation between a fluid flow, for example oil flow, inside the fluid rotary machine and rotational speed of the output shaft. However, as already mentioned, this does not exclude that the motor shaft may control the rotational movement of the valve element, which may control the fluid flow to the gear wheel and may thus influence the rotational movement of the gear wheel. The gear wheel is therefore rotatable by the fluid flow controlled by the valve element and rotational movement of the gear wheel, which may be orbiting rotational movement, is transferred to the output shaft by the cardan shaft.

The fluid rotary machine may extend from a first end side to a second end side along a longitudinal axis, which may, for example, be a motor shaft axis. The motor may be arranged on one side, for example, the first end side, and the valve element may be arranged along the longitudinal axis in series and coupled to the motor shaft. The components of the second movement chain may also be arranged along the longitudinal axis, wherein the gear wheel may be arranged closest to the valve element and may be coupled to the output shaft via the cardan shaft, which may extend essentially parallel the longitudinal axis, and wherein the output shaft may be arranged on the second end side of the fluid rotary machine opposite the motor. All or some of the components of the first and/or second movement chain may rotate about the longitudinal axis.

Further, the fluid rotary machine comprises an encoder module. The encoder module may form part of the motor. The encoder module may form part of the motor control unit. The encoder module may for example be arranged inside a motor housing of the motor. The encoder module may also be arranged inside the motor housing and may form part of the motor control unit arranged inside the motor housing. However, when the motor control unit is external, the encoder module may also be arranged with the motor control unit. The motor housing may form part of the housing of the fluid rotary machine.

The encoder module further comprises a sensor arrangement configured to detect rotational movement of a component of the second movement chain. For example, the sensor arrangement may be configured to detect rotational movement of the cardan shaft and/or the output shaft. Preferably, the sensor arrangement is configured to detect movement of a component of the second movement chain which is performing a pure rotational movement. The sensor arrangement may comprise optical, magnetic, capacitive, or mechanical sensors configured to detect rotational movement of the cardan shaft and/or the output shaft. Preferably, the sensor arrangement comprises an EMD speed sensor.

According to one aspect, the sensor arrangement may comprise a transmitter and a receiver. The receiver may detect movement of the transmitter. For example, the transmitter may comprise an encoder pattern or a magnet. The transmitter may be rotating as part of the second movement chain. The transmitter may be for example part of the cardan shaft and/or the output shaft. For example, the receiver may detect rotational movement by detection of reflections of the encoder pattern, i.e. optical, or by detection of a change in magnet field, i.e. magnetic. Data about the rotational movement of a component of the second movement chain, for example, rotational movement of the cardan shaft and/or the output shaft, detected by the sensor arrangement may be transmitted to the motor control unit. Data may be an output voltage which may decrease or increase depending on the rotational movement of the component of the second movement chain. The motor control unit may use this data to control rotational movement of the motor shaft and thereby of the valve element. Consequently, the encoder module may allow for a feedback loop and as such for a flexible and accurate control of the valve element independent of the output shaft. For example, the fluid rotary machine allows for a closed loop control, wherein data from the sensor arrangement of the encoder module may be used in a feedback loop for controlling a rotational speed of the motor, which is rotating the valve element, thereby controlling or regulating a rotational speed of the output shaft of the fluid rotary machine.

Rotation of the valve element independent from the second movement chain may further allow rotation of the output shaft at variable speeds with constant or reduced fluid flow supplied to the valve element. In other words, volumetric efficiency of the fluid rotary machine may be improved, as rotational speed of the output shaft no longer depends solely on the fluid flow but is assisted by the motor. Hence, power needed to supply fluid flow to the valve element, for example by a pump, may be reduced.

Further, controlling rotation of the valve element independently from the second movement chain, may allow to offset a rotational position of the valve element with respect to a rotational position of the gear wheel by a greater angle, thereby controlling commutation of the fluid rotary machine, i.e., the output shaft may either be rotating clockwise or counterclockwise and may be switched between the directions of rotation. Furthermore, allowing more flexible and accurate control of the valve element and thus of direction of rotation of the output shaft, may also allow to improve the shape of the fluid path with respect to flow pressure of the fluid.

In addition, power supplied to the motor or current drawn by the motor may be detected. Knowledge about power consumption of the motor may then be used to determine a function for the fluid rotary machine in which the output shaft rotates at constant speed. The inventive concept may thus also serve as a low-resolution torque transducer.

In one embodiment, the second movement chain may comprise an encoder cardan rotationally coupled to the gear wheel. Therefore, the encoder cardan may rotate together with the gear wheel. The encoder cardan may comprise outer splines which may engage with the inner splines of the gear wheel. Thus, the encoder module, or to be more precise the sensor arrangement of the encoder module, may be configured to detect rotational movement of the encoder cardan. The encoder cardan and the cardan shaft may both be inserted into the through hole of the gear wheel and may extend towards opposite directions. The encoder cardan and the cardan shaft may thus be rotationally coupled to the gear wheel and may rotate together. The encoder cardan may extend towards the encoder module. The encoder cardan may be closer to the encoder module than the gear wheel and the cardan shaft. Further, the encoder cardan may be supported on one side in the valve element. The encoder cardan may therefore be used to pick up an orbiting rotational movement of the gear wheel on one side to perform an essentially purely rotational movement on the other side, for example on the side which is supported in the valve element.

The encoder cardan may rotate synchronously with the output shaft of the second movement chain. The encoder cardan may therefore facilitate the detection of the rotational movement of a component of the second movement chain.

According to one embodiment, the encoder module may comprise a transfer element mechanically coupled a component of the second movement chain, for example to the cardan shaft, the output shaft or the encoder cardan. The transfer element may be configured to transfer rotational movement of the cardan shaft, the output shaft or the encoder cardan to the sensor arrangement of the encoder module. For example, the transfer element may be configured to transmit a torque to the sensor arrangement. In one aspect, the transfer element may transfer rotational movement to the transmitter. The sensor arrangement may be configured to detect the rotational movement of the transfer element. The transfer element may be a speedometer cable or a thin metal stick. The use of the transfer element may allow to arrange the sensor arrangement closer to the first movement chain than to the second movement chain. Further, the transfer element may allow to arrange the sensor arrangement at the motor of the first movement chain. For example, the sensor arrangement may be arranged inside the motor of the first movement chain. An example for a suitable transfer element which could be used with the fluid rotary machine may be provided in U.S. Pat. No. 9,086,050 B2. The transfer element may allow detection of rotational movement of a component of the second movement chain and may allow to transmit or transfer rotational movement to the encoder module, which may be arranged as part of the motor. Preferably, the transfer element is configured and arranged to a component of the second movement chain of the fluid rotary machine performing a purely rotational movement. For example, the transfer element may be connected to an end face of a component of the second movement chain, for example to the encoder cardan. Hence, the transfer element may allow to transfer rotational movement towards the first movement chain.

In one embodiment, the gear wheel may comprise a first side directed towards the output shaft and a second side opposite to said first side. The second side may be directed towards the motor. The encoder module may be at least partially arranged on the second side of the gear wheel. In other words, the encoder module may be arranged on the side of the gear directed towards the motor. The transfer element may pass through the gear wheel to transfer rotational movement, for example, rotational movement of the output shaft, to the encoder module arranged on the opposite side of the gear wheel. The encoder cardan may avoid that the transfer element has to pass through the gear wheel as rotational movement of the second movement chain may be detected from the encoder cardan. In addition, arrangement of the encoder module on the same side of the gear wheel as the motor allows to use data detected by the encoder module more easily at the motor.

According to one embodiment, the motor shaft may comprise a motor shaft channel. The valve element may comprise a valve element channel. The transfer element may at least be arranged inside the motor shaft channel and may pass through the valve element channel. The motor shaft channel of the motor shaft, which is coupled to the valve element, may thus together with the valve element channel provide a through channel. The through channel may be arranged on the motor shaft axis which may be in line with the longitudinal axis of the fluid rotary machine. The transfer element may allow to transfer rotational movement through the channels of the valve element and the motor shaft to the encoder module. The transfer element may run along an axis of rotation of the component of the second movement chain from which the rotational movement is transferred to the encoder module. The channels may be provided by through bores. The channels may protect the transfer element. The channels may have the same or different diameters. Each channel may have portions with greater and portions with smaller diameters.

In one embodiment, the encoder cardan may comprise an encoder cardan channel and/or the cardan shaft may comprise a cardan shaft channel. The transfer element may pass through the encoder cardan channel and/or the cardan shaft channel. The transfer element may thus pass through the motor shaft channel, the valve element channel, the encoder cardan channel and the cardan shaft channel. Since the cardan shaft and the encoder cardan are both partially arranged in the gear wheel, the transfer element may also pass through the gear wheel. The transfer element may pass through the motor shaft channel, the valve element channel, the encoder cardan channel and the cardan shaft channel and may end in a recess of an end face of the output shaft. Preferably, all channels are designed and arranged in such a way that the transfer element does not come into contact with a channel wall. All channels may have same diameters. However, the diameters of the channels may also differ. The diameter of a component's channel may also vary over its length and be of different sizes. For example, the diameter of channel within components which may perform a orbiting rotational movement may be greater than the diameters of the channels within components that perform pure rotational movements. Also the diameter of a channel portion closer to an orbiting rotational component may be greater than the diameter of a channel closer to a component performing a pure rotational movement. The channels of one component may also run or merge directly into the channel of another component. The channel of one component may also be arranged at least partially inside the channel of another component. Further, the channels of two components may also be spaced apart in a direction of extension of the transfer element. Preferably the channel of one component, for example, the valve element channel, runs at least parallel to a longitudinal axis of the respective component, i.e. the valve element.

In one embodiment, the encoder module may be configured to communicate data related to the detected rotational movement to the motor control unit, to a monitoring unit and/or to a storage unit. The data relates to rotational movement detected by the sensor arrangement. The encoder module may directly use a sensor output as data or may process the sensor output in order to provide the data, i.e. processed data, which may then be communicated. The encoder module may thus transmit data related to the rotational movement, for example, wirelessly to the motor control unit, to the monitoring unit and/or to the storage unit. The data may be used in the motor control unit to determine a control signal transmitted to the motor dependent on the data. For example, the data may indicate that the rotational speed of the output shaft decreases, whereupon the speed of the motor is increased and thus the valve element rotates faster. However, the data may also be used in the monitoring unit for monitoring purposes of the fluid rotary machine. The monitoring unit may for example be a display that allows a user to monitor parameters of the fluid rotary machine. The data may also be stored in the storage unit and may be processed later. For example, if the fluid rotary machine malfunctions, the data may provide information about incorrect use of the machine.

According to a further embodiment, the motor control unit may be configured to control the rotational movement of the motor shaft based on the data related to the detected rotational movement. Hence, and as mentioned above, the data may be used to provide a feedback loop and thus may allow control of the motor shaft, for example, the rotational speed of the motor shaft, based on the data of the encoder module. The encoder module may therefore communicate the data to the motor control unit which may then select a corresponding control signal with respect to the data which is transmitted to the motor. Depending on the control signal the motor may then change its speed, its direction of rotation and/or its rotational position. The feedback loop therefore allows direct intervention when deviations from target values of the fluid rotary machine are detected, for example, when the output shaft or the cardan shaft are rotating to slow.

Further, the rotational movement detected by the encoder module may be a rotational speed, a direction of rotation and/or a rotational position.

In one embodiment, the motor control unit may be configured to increase a torque of the motor shaft applied to the valve element when a decrease of the rotational speed of the cardan shaft, the output shaft or the encoder cardan is detected. The fluid rotary machine may thus provide a torque converter. The rotational speed of the cardan shaft, the output shaft or the encoder cardan may be transferred to the sensor arrangement of the encoder module via the transfer element.

Further, the rotational movement of the output shaft may be controlled by the fluid flow supplied to the gear wheel and the rotational movement of the motor shaft rotating the valve element. As aforementioned, fluid flow may be supplied to pressure pockets or chambers of the gear wheel. Fluid flow may be controlled by the valve element. Positioning of the valve element may be controlled by the motor shaft.

As aforementioned and according to one embodiment, the motor shaft may be configured to be rotated about a motor shaft axis. Further, the output shaft may be configured to be rotated about an output shaft axis. The motor shaft axis and the output shaft axis are parallel to one another, preferably congruent. In one embodiment, the motor shaft axis and the output shaft axis may be in line. The components of the first movement chain and the second movement chain may therefore essentially be arranged along the longitudinal axis. The motor shaft axis and the output shaft axis may further be parallel to the longitudinal axis of the fluid rotary machine. The relative arrangement of the components and axes may reduce the complexity and size of the fluid rotary machine.

In one embodiment, the motor may be configured to rotate the motor shaft clockwise or counterclockwise. The direction of rotation of the motor shaft may influence the direction of rotation of the output shaft. For example, the output shaft may rotate clockwise when the motor shaft rotates clockwise. However, the output shaft may also rotate counterclockwise when the motor shaft rotates clockwise. Direction of rotation may impact the efficiency of the fluid rotary machine. As the fluid flow through the fluid rotary machine may not be symmetric, in one embodiment clockwise rotation may be more or less efficient than rotation in the counterclockwise direction. Rotation of the valve element by the motor shaft of the motor may simplify switching of the direction of rotation of the output shaft.

According to one embodiment, the motor may be an electric motor. For example, the motor may be an AC or DC motor. The motor may for example be a step motor. The use of an electric motor allows fast modifications of the motor shaft rotation depending on control signals from the motor control unit.

In one embodiment, the encoder module may form an integral part of the motor. "Integral part" may mean that that removal of the encoder module renders the motor unusable in the sense that it may no longer drive the motor shaft after removal of the encoder module. However, and as aforementioned, the encoder module may also be a separate component.

In summary, the fluid rotary machine may thus allow more flexible and accurate control of rotational movements of the output shaft. In this regard, the rotational movement of the valve element is controlled by the motor. The first movement chain and the second movement chain are mechanically uncoupled. Further, the encoder module is configured to detect rotational movements of components of the second movement chain.

Additional features, advantages and possible applications of the invention result from the following description of exemplary embodiments and the drawings. All the features described and/or illustrated graphically here form the subject matter of the invention, either alone or in any desired combination, regardless of how they are combined in the claims or in their references back to preceding claims.

BRIEF DESCRIPTION OF THE DRAWINGS

Preferred embodiments of the invention will now be described with reference to the drawings, in which.

DETAILED DESCRIPTION

Figure 1:
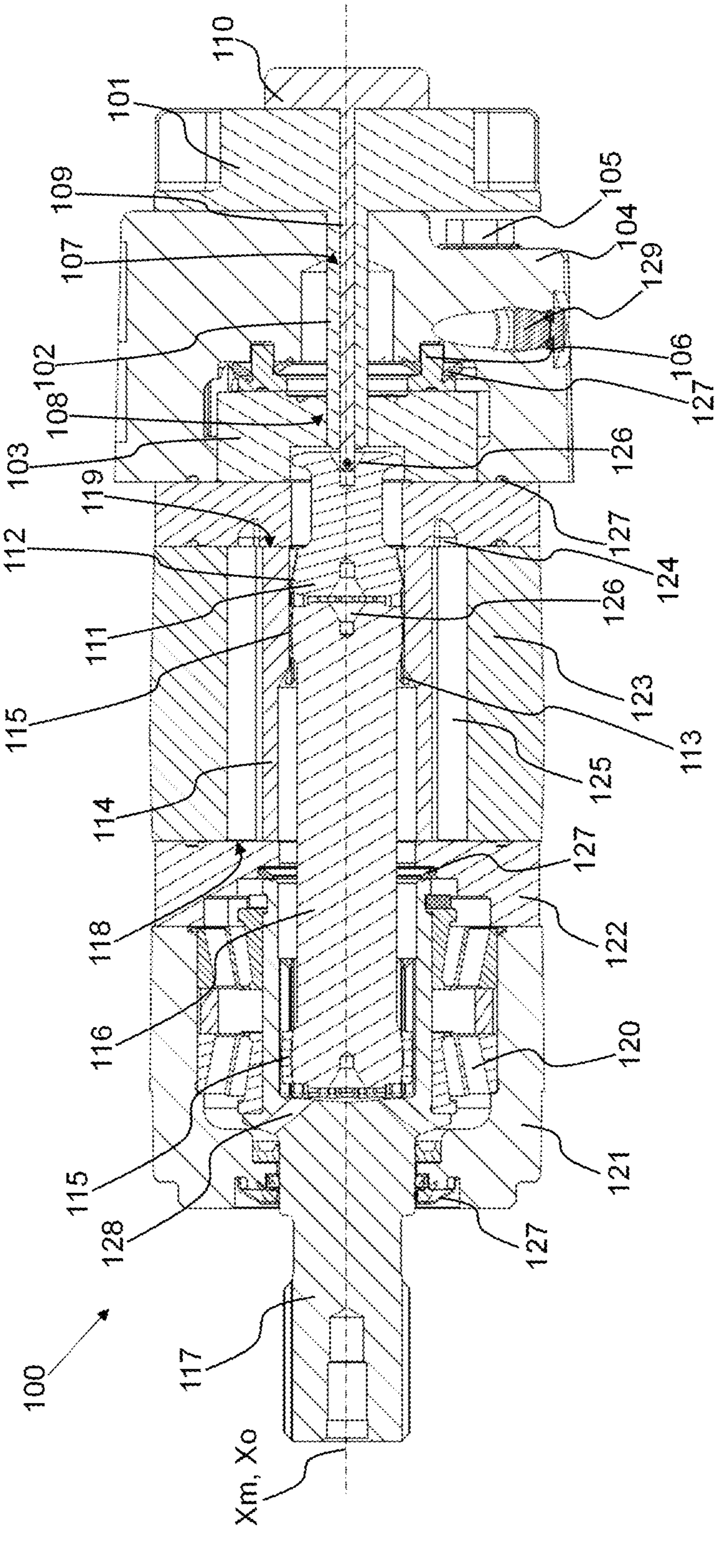
FIG. 1 shows a sectional view of a first example of a fluid rotary machine comprising a disc valve.
Figure 2:
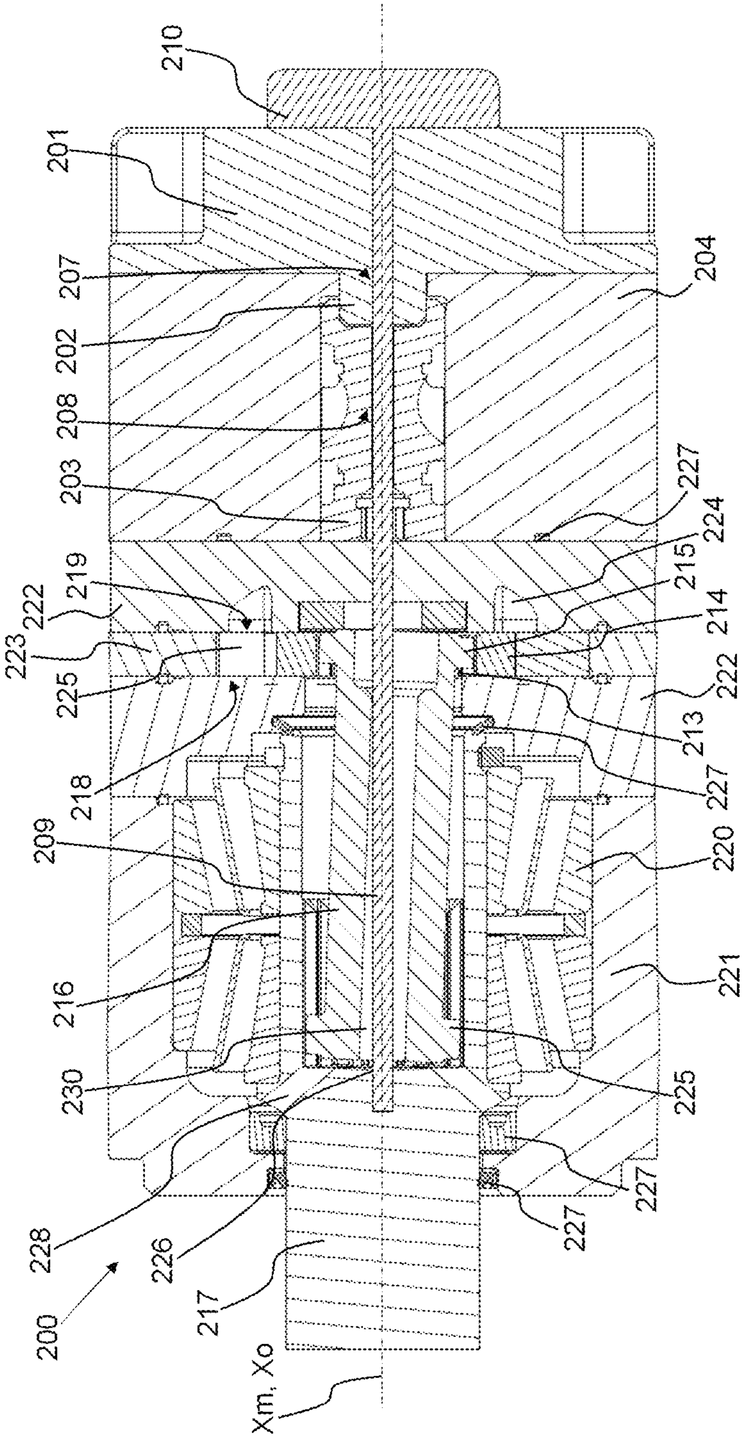
FIG. 2 shows a sectional view of a second example of a fluid rotary machine comprising a spool valve.

FIGS. 1 and 2 both show different examples of a fluid rotary machine 100, 200. Components of the fluid rotary machine 100 of FIG. 1 and of the fluid rotary machine 200 of FIG. 2 which act identical or which are provided for the same purposes, are provided with reference signs that comprise the identical two end numbers. For example, reference sign 101 is used for a motor of the first example of FIG. 1, wherein reference sign 201 is used for a motor in the second example of FIG. 2. Similarly, motor shafts of the motors 101 and 201 both comprise the reference signs 102 and 202.

In FIG. 1 the motor 101 is arranged on a first end side of the fluid rotary machine 100. The motor 101 comprises the motor shaft 102 extending along a motor shaft axis Xm towards a second end side of the fluid rotary machine 100. The motor shaft 102 is rotationally coupled to a valve element 103, which is here a disc valve element. The motor shaft 102 as well as the disc valve element are rotated about the motor shaft axis Xm. Due to the coupling between the motor shaft 102 and the valve element 103, the valve element 103 rotates together with the motor shaft 102.

The valve element 103 is arranged inside a valve element housing 104. A housing of the fluid rotary machine 100 may be provided by several housing components which may for example be joined together using screws 105. In the direction of the motor 101, the valve element 103 is balanced via balancing elements 106. The balancing elements 106 may comprise springs.

The valve element 103 and the motor 101 together form a first movement chain. A motor shaft channel 107 is arranged within the motor shaft 102. The valve element 103 also comprises a channel, a so-called valve element channel 108, into which the motor shaft 102 protrudes. Therefore, the motor shaft channel 107 is at least partially arranged in the valve element channel 108. In the area of the valve element 103, the motor shaft channel 107 is therefore also partially located in the valve element channel 108.

The motor shaft channel 107 and the valve element channel 108 together allow a transfer element 109 to extend from the first movement chain side in the direction of a second movement chain, in particular in order to detect a rotational movement of a component of the second movement chain. For this purpose, the transfer element 109 transmits or transfers the movement to an encoder module 110, shown schematically in FIG. 1, which comprises a sensor arrangement (not shown) in order to detect information transmitted by the transfer element 109. Here, the transfer element 109 transfers information of an encoder cardan 111, which is supported in the valve element 103, in the direction of the first movement chain. The encoder cardan 111 is coupled in an opposite direction of the valve element 103 via outer splines 112, which are partially arranged on an outer circumference of the encoder cardan 111, to inner splines 113 arranged in a through hole of a gear wheel 114. Rotation of the gear wheel 114 thus also rotates the encoder cardan 111. However, the encoder cardan 111 is not mechanically coupled to the valve element 103, for example by splines. Therefore, the encoder cardan 111 is configured to be rotated relative to the valve element 103. Just for the sake of clarity, for example, the encoder cardan 111 could rotate clockwise and the valve element 103 could rotate counterclockwise as both components are mechanically uncoupled.

Further, outer splines 115 on an outer circumference of a cardan shaft 116 are in splined engagement with the inner splines 113 of the gear wheel 114. Thus, also the cardan shaft 116 rotates together with the gear wheel 114. Although the transfer element 109 in FIG. 1 transmits information of the rotational movement of the encoder cardan 111, the transfer element 109 could also transmit information of the rotational movement of other components of the second movement chain such as the cardan shaft 116 and/or an output shaft 117. In this regard, the encoder cardan 111 and the cardan shaft 116 would also require a respective channel (not shown) through which the transfer element 109 could be passed. The encoder cardan 111 could also simply be omitted and the transfer element could be used directly on the cardan shaft 116.

The output shaft 117 comprises a splined engagement with the cardan shaft 116. Therefore, the cardan shaft 116 comprises further outer splines 115 on the output shaft 117 side, which are engaged with respective splines of the output shaft 117. The output shaft 117 side of the cardan shaft 116 is located on a side of the gear wheel 114 that is directed towards the output shaft 117. This side of the gear wheel 114 is called first side 118. A second side 119 of the gear wheel 114 is arranged opposite to the first side 119 and therefore facing the valve element 103 and the motor 101.

Rotation of the gear wheel 114 may thus rotate the encoder cardan 111 as well as the cardan shaft 116 and, due to the splined engagement with the output shaft 117, also the output shaft 117. The output shaft 117 rotates about an output shaft axis Xo. In FIGS. 1 and 2, the output shaft axis Xo is in line with the motor shaft axis Xm. Rotation of the output shaft 117 may be used for various applications in work and drive systems. The output shaft 117 is supported by a bearing 120 in a bearing housing 121. A side of the cardan shaft 116 opposite to the output shaft 117 and forming a splined engagement between the cardan shaft 116 and the gear wheel 114 may perform an orbiting rotational movement together with the gear wheel 114. The bearing housing 121 is spaced by a plate 122, for example a wear or space plate, from a gear wheel housing 123 in which the gear wheel 114 is rotated.

To ensure that the gear wheel 114 is rotated, fluid, for example provided by a pump (not shown), is supplied via ports 124 into chambers 125 of the gear wheel 114. The gear wheel 114 is then rotated inside the gear wheel housing 123. The fluid flow is controlled by the rotation of the valve element 103, which is rotated by the motor shaft 102. Thus, depending on rotational direction, rotational speed and/or rotational position of the valve element 103, which is controlled by the motor shaft 102 the motor 101, the fluid flow to the gear wheel 114 and therefore rotational movement of the gear wheel 114 can be controlled.

The transfer element 109 may for example provide feedback about the rotational movement of a component of the second movement chain such as the encoder cardan 111, the cardan shaft 116 and/or the output shaft 117. This feedback may be used to control the motor 101 by a motor control unit (not shown). The motor control unit may be arranged inside the motor 101. The transfer element 109 may be configured to transmit information about rotational movement to the sensor arrangement of the encoder module 110, for example by rotating the transfer element 110. The transfer element 110 may thus for example be connected to the respective component of the second movement chain. As shown in FIG. 1, the transfer element 110 may for example be connected to an end face 126 of the of the respective component of the second movement chain. The end face 126 may have any shape or design and may comprise a recess or coupling means. However, the transfer element 109 may also be configured to transmit information about rotational movement to the sensor arrangement without rotating.

Further, the gear wheel 114 may also perform an orbiting rotational movement. The portion of the encoder cardan 111 comprising outer splines 112, which is in engagement with the gear wheel 114, thus follow the movement of the gear wheel 114. However, a side of the encoder cardan 111 facing the first movement chain and comprising the end face 116 is supported by the valve element 103. As the valve element 103 is not orbiting, the end face 116 is performing a pure rotational movement, at least close to a center of the encoder cardan 111, which may be transmitted by the transfer element 109 and detected by the sensor arrangement of the encoder module 110. The rotational movement of the end face 116 corresponds to the rotational movement of the output shaft 117. Therefore, the aforementioned arrangement of the components allows to detect a pure rotational movement of a component of the second movement chain.

Furthermore, various seals 127 and fluid channels 128 are provided as part of the fluid rotary machine 100 to allow and control fluid flow inside the fluid rotary machine 100 or protect the fluid rotary machine 100 from external environmental influences. A relief valve 129 may open in the event of excess pressure in the system. The fluid circuit may be an open or closed circuit.

In FIG. 2, another example of a fluid rotary machine 200 is shown. Here a valve element 203 is provided by a spool valve. Further, a motor shaft channel 207 of a motor 201 runs into or merges with a valve element channel 208 of the spool valve element. Also here, the valve element 203 is arranged inside a valve element housing 204 and rotated by rotation of a motor shaft 202 of the motor 201. Rotation of the valve element 203 controls the fluid flow to via ports 224 to chambers 225 of gear wheel 214. The gear wheel 214 is in splined engagement by inner splines 213 with outer splines 215 of a cardan shaft 216. The gear wheel 214 is configured to rotate inside a gear wheel housing 223.

A transfer element 209 passes through the motor shaft channel 207, the valve element channel 208, a plate 222 and further inside a cardan shaft channel 230 to an end face 226 of an output shaft 217. Here, the end face 226 of the output shaft 217 comprises a recess. Due to orbiting rotational movement of the gear wheel 214 and thus the cardan shaft 216, and to prevent the cardan shaft 216 from bending the transfer element 209, the cardan shaft channel 230 comprises a greater diameter on an end closer to the first movement chain. Consequently, the cardan shaft channel 230 does not have the same diameter over its entire length. The transfer element 209 thus runs straight to an encoder module 210 on a first end side of the fluid rotary machine 200. The first end side is on a second side 219 of the gear wheel 214 facing the motor 201. A first side 218 of the gear wheel 214 faces the output shaft 217 which is supported by a bearing 220 in a bearing housing 221. As for the first example of the fluid rotary machine 100, also the fluid rotary machine 200 comprises several seals 227 and fluid channels 228 to provide fluid flow inside the fluid rotary machine 200.

In summary, the main difference between the first fluid rotary machine 100 and the second fluid rotary machine 200 is the use of a different valve element 203, namely a spool valve element instead of a disc valve element. In addition, the component of the second movement chain of which rotational movement is transmitted or transferred to the sensor arrangement of the encoder module 210 is different. However, in both fluid rotary machines 100, 200 the first movement chain provided by the motors 101, 201 and the valve elements 103, 203 is mechanically uncoupled from the second movement chain provided by encoder shaft 111, the gear wheel 114, the cardan shaft 116 and the output shaft 117 or by the gear wheel 214, the cardan shaft 216 and the output shaft 217.

Detection of the rotational movement of a component of the second movement chain thus allows to control the first movement chain independent of the second movement chain which allows for the aforementioned improvements. In addition, detection of rotational movement of a component of the second movement chain has further beneficial effects.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fluid rotary machine comprising:

a first movement chain comprising a motor with a motor shaft rotationally coupled to a valve element and a motor control unit configured to control rotational movement of the motor shaft, wherein, dependent on the rotational movement of the motor shaft, the valve element is configured to control a fluid flow to a gear wheel of a second movement chain, the second movement chain comprising the gear wheel, a cardan shaft and an output shaft, wherein the cardan shaft is rotationally coupled to the gear wheel and the output shaft, wherein the gear wheel, the cardan shaft and the output shaft are rotatable relative to the motor shaft, wherein the gear wheel is rotatable by said fluid flow and rotational movement of the gear wheel is transferred to the output shaft by the cardan shaft, and an encoder module comprising a sensor arrangement configured to detect rotational movement of a component of the second movement chain, wherein the second movement chain comprises an encoder cardan rotationally coupled to the gear wheel, and wherein the encoder module is configured to detect the rotational movement of the encoder cardan.

2. The fluid rotary machine according to claim 1, wherein the encoder module comprises a transfer element mechanically coupled to the component of the second movement chain, wherein the transfer element is configured to transfer rotational movement of the cardan shaft, the output shaft or the encoder cardan to the sensor arrangement of the encoder module, and wherein the sensor arrangement is configured to detect the rotational movement of the transfer element.

3. The fluid rotary machine according to claim 1, wherein the gear wheel comprises a first side directed towards the output shaft and a second side opposite to said first side, wherein the second side is directed towards the motor, and wherein the encoder module is at least partially arranged on the second side of the gear wheel.

4. The fluid rotary machine according to claim 1, wherein the motor shaft comprises a motor shaft channel, wherein the valve element comprises a valve element channel, wherein a transfer element is at least arranged inside said motor shaft channel, and wherein the transfer element passes through the valve element channel.

5. The fluid rotary machine according to claim 4, wherein additionally the encoder cardan comprises an encoder cardan channel and/or the cardan shaft comprise a cardan shaft channel, and wherein the transfer element passes through the encoder cardan channel and/or the cardan shaft channel.

6. The fluid rotary machine according to claim 1, wherein the encoder module is configured to communicate data related to the detected rotational movement to the motor control unit, to a monitoring unit and/or to a storage unit.

7. The fluid rotary machine according to claim 6, wherein the motor control unit is configured to control the rotational movement of the motor shaft based on the data related to the detected rotational movement.

8. The fluid rotary machine according to claim 1, wherein the rotational movement detected by the encoder module is a rotational speed, a direction of rotation and/or a rotational position.

9. The fluid rotary machine according to claim 8, wherein the motor control unit is configured to increase a torque of the motor shaft applied to the valve element when a decrease of the rotational speed of the cardan shaft, the output shaft or the encoder cardan is detected.

10. The fluid rotary machine according to claim 1, wherein the rotational movement of the output shaft is controlled by the fluid flow supplied to the gear wheel and the rotational movement of the motor shaft rotating the valve element.

11. The fluid rotary machine according to claim 1, wherein the motor shaft is configured to be rotated about a motor shaft axis, wherein the output shaft is configured to be rotated about an output shaft axis, and wherein the motor shaft axis and the output shaft axis are parallel to one another.

12. The fluid rotary machine according to claim 1, wherein the motor is configured to rotate the motor shaft clockwise or counterclockwise.

13. The fluid rotary machine according to claim 1, wherein the motor is an electric motor.

14. The fluid rotary machine according to claim 1, wherein the encoder module forms an integral part of the motor.

15. The fluid rotary machine according to claim 1, wherein the valve element is a disc valve element or a spool valve element.

16. The fluid rotary machine according to claim 1, wherein the component of the second movement chain is the cardan shaft and/or the output shaft.

17. The fluid rotary machine according to claim 2, wherein the transfer element is mechanically coupled to the cardan shaft, the output shaft or the encoder cardan.

18. The fluid rotary machine according to claim 11, wherein the motor shaft axis and the output shaft axis are congruent.

19. A fluid rotary machine comprising:

a first movement chain comprising a motor with a motor shaft rotationally coupled to a valve element and a motor control unit configured to control rotational movement of the motor shaft, wherein, dependent on the rotational movement of the motor shaft, the valve element is configured to control a fluid flow to a gear wheel of a second movement chain, the second movement chain comprising the gear wheel, a cardan shaft and an output shaft, wherein the cardan shaft is rotationally coupled to the gear wheel and the output shaft, wherein the gear wheel, the cardan shaft and the output shaft are rotatable relative to the motor shaft, wherein the gear wheel is rotatable by said fluid flow and rotational movement of the gear wheel is transferred to the output shaft by the cardan shaft, and an encoder module comprising a sensor arrangement configured to detect rotational movement of a component of the second movement chain, wherein the gear wheel comprises a first side directed towards the output shaft and a second side opposite to said first side, wherein the second side is directed towards the motor, and wherein the encoder module is at least partially arranged on the second side of the gear wheel.

20. A fluid rotary machine comprising:

a first movement chain comprising a motor with a motor shaft rotationally coupled to a valve element and a motor control unit configured to control rotational movement of the motor shaft, wherein, dependent on the rotational movement of the motor shaft, the valve element is configured to control a fluid flow to a gear wheel of a second movement chain, the second movement chain comprising the gear wheel, a cardan shaft and an output shaft, wherein the cardan shaft is rotationally coupled to the gear wheel and the output shaft, wherein the gear wheel, the cardan shaft and the output shaft are rotatable relative to the motor shaft, wherein the gear wheel is rotatable by said fluid flow and rotational movement of the gear wheel is transferred to the output shaft by the cardan shaft, and an encoder module comprising a sensor arrangement configured to detect rotational movement of a component of the second movement chain, wherein the motor shaft comprises a motor shaft channel, wherein the valve element comprises a valve element channel, wherein a transfer element is at least arranged inside said motor shaft channel, and wherein the transfer element passes through the valve element channel.

* * * * *